United States Patent
Nakagawa

(10) Patent No.: US 10,428,947 B2
(45) Date of Patent: Oct. 1, 2019

(54) SEALING DEVICE

(71) Applicant: NOK CORPORATION, Tokyo (JP)

(72) Inventor: Takehiro Nakagawa, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 15/523,608

(22) PCT Filed: Nov. 9, 2015

(86) PCT No.: PCT/JP2015/081426
§ 371 (c)(1),
(2) Date: May 1, 2017

(87) PCT Pub. No.: WO2016/076247
PCT Pub. Date: May 19, 2016

(65) Prior Publication Data
US 2017/0314681 A1 Nov. 2, 2017

(30) Foreign Application Priority Data

Nov. 11, 2014 (JP) ................................. 2014-228768

(51) Int. Cl.
*F16J 15/00* (2006.01)
*F16J 15/3204* (2016.01)
(Continued)

(52) U.S. Cl.
CPC ......... *F16J 15/002* (2013.01); *F16J 15/3204* (2013.01); *F16J 15/3212* (2013.01);
(Continued)

(58) Field of Classification Search
CPC ...... F16J 15/164; F16J 15/3264; F16J 15/363; F16J 15/366; F16J 15/36; F16J 15/34; F16J 15/3404; F16J 15/002
(Continued)

(56) References Cited

U.S. PATENT DOCUMENTS 1,505,321 A * 8/1924 Dennedy ................ F16J 15/363
277/368
2,259,422 A * 10/1941 Karlberg .................. F16J 15/38
277/390

(Continued)

FOREIGN PATENT DOCUMENTS

CN 1174306 A 2/1998
DE 1300747 B * 8/1969
(Continued)

OTHER PUBLICATIONS

Extended European Search Report for Patent Application No. 15858567.9 dated Dec. 13, 2017 (7 pages).

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A sealing device includes a metal ring, a main lip, an annular elastic body, a sliding ring, and biasing means. The metal ring is hermetically fixed to a housing. The main lip is bonded to the metal ring and is slidably in close contact with an outer periphery surface of a rotating body inserted through an inner circumference of the housing. The annular elastic body is bonded to the metal ring on an outer side of the main lip, and stretchable in an axial direction. The sliding ring is provided at an end portion of the annular elastic body on a side opposite the metal ring, and is slidably in close contact with a seal flange attached to an outer periphery of the rotating body. The biasing means is configured to elastically press the sliding ring against the seal flange, thereby maintaining stable sealability over an extended period of time.

4 Claims, 3 Drawing Sheets

(51) Int. Cl.
   *F16J 15/34* (2006.01)
   *F16J 15/36* (2006.01)
   *F16J 15/3212* (2016.01)

(52) U.S. Cl.
   CPC .......... *F16J 15/34* (2013.01); *F16J 15/3436* (2013.01); *F16J 15/36* (2013.01)

(58) Field of Classification Search
   USPC ................................................ 277/390, 391
   See application file for complete search history.

(56) References Cited

U.S. PATENT DOCUMENTS

| | | | | |
|---|---|---|---|---|
| 2,267,994 A * | 12/1941 | Reynolds | ................ | B60B 27/00 277/368 |
| 2,316,059 A * | 4/1943 | Fretter | ................ | F16J 15/38 277/372 |
| 2,432,694 A * | 12/1947 | Snyder | ................ | F16J 15/36 277/372 |
| 2,521,137 A * | 9/1950 | Vedovell | ................ | F16J 15/36 277/372 |
| 2,586,739 A * | 2/1952 | Summers | ................ | F16J 15/38 277/362 |
| 2,866,656 A * | 12/1958 | Dobrosavljevic | ........ | F16J 15/36 277/383 |
| 2,930,644 A * | 3/1960 | Kosatka | ................ | F16J 15/36 277/373 |
| 3,059,936 A * | 10/1962 | Barrett | ................ | F16J 15/36 277/375 |
| 3,189,357 A * | 6/1965 | Talamonti | ................ | F16J 15/36 277/373 |
| 3,355,178 A * | 11/1967 | Hornaday | ................ | F16J 15/36 277/372 |
| 3,554,559 A * | 1/1971 | Dahlheimer | ............. | F16J 15/36 277/348 |
| 3,892,498 A * | 7/1975 | Jacuzzi | ................ | F04D 29/126 277/390 |
| 4,335,888 A * | 6/1982 | Ohba | ................ | F16J 15/3496 277/306 |
| 4,380,416 A * | 4/1983 | Menager | ................ | F04D 29/126 277/361 |
| 4,502,694 A * | 3/1985 | Uhrner | ................ | F16J 15/36 277/373 |
| 4,815,747 A * | 3/1989 | Wolford | ................ | F04D 29/126 277/306 |
| 4,992,023 A * | 2/1991 | Baker | ................ | F04D 29/106 277/348 |
| 5,199,719 A * | 4/1993 | Heinrich | ................ | F16J 15/36 277/374 |
| 5,336,047 A * | 8/1994 | Kolhouse | ............. | F04D 29/126 277/353 |
| 5,797,602 A * | 8/1998 | Less | ................ | F16J 15/348 277/372 |
| 7,080,510 B2 * | 7/2006 | Ishihara | ................ | F02B 37/183 251/14 |
| 2011/0006485 A1* | 1/2011 | Nakagawa | ............ | F16J 15/164 277/549 |
| 2011/0079961 A1* | 4/2011 | Hoffmann | ............ | F16J 15/3476 277/500 |
| 2013/0087978 A1 | 4/2013 | Nakagawa | | |

FOREIGN PATENT DOCUMENTS

| | | |
|---|---|---|
| DE | 4441474 A1 | 5/1996 |
| DE | 102010044588 A1 | 6/2011 |
| JP | S60-110771 U | 7/1985 |
| JP | H09-144536 A | 6/1997 |
| JP | 2003-262232 A | 9/2003 |
| JP | 2009-103142 A | 5/2009 |
| JP | 2010-014181 A | 1/2010 |
| JP | 2010-025138 A | 2/2010 |
| JP | 2010-255733 A | 11/2010 |
| JP | 2011-058585 A | 3/2011 |
| JP | 2013-130296 A | 7/2013 |

* cited by examiner

SEALING DEVICE

CROSS-REFERENCE TO RELATED APPLICATIONS

This application is a U.S. National Stage Application of International Application No. PCT/JP2015/081426, filed on Nov. 9, 2015, and published in Japanese as WO 2016/076247 A1 on May 19, 2016 and claims priority to Japanese Application No. 2014-228768, filed on Nov. 11, 2014. The entire disclosures of the above applications are incorporated herein by reference.

BACKGROUND OF THE INVENTION

Field of the Invention

The present invention relates to a sealing device for sealing parts that are prone to exposure to muddy water and the like from a machine exterior, such as a transfer device, transmission, and differential gear of a vehicle.

Description of the Conventional Art

Conventionally, a sealing device 101 as illustrated in FIG. 3 is known as a sealing device for sealing a shaft periphery of a part prone to exposure to muddy water and the like from a machine exterior. This sealing device 101 includes a seal member 131 adhered to a metal ring 111. The seal member 131 includes a main lip 132, a side lip 133, and an outer periphery seal portion 134 formed therein. With the seal member 131, the outer periphery seal portion 134 formed on an outer diameter side of the metal ring 111 is press fitted against an inner circumferential surface of a housing 142, and the main lip 132 comes in close contact with, in a slidable manner, an outer periphery surface of a sleeve 144 attached to an outer periphery of a rotating shaft 143. Thereby, oil on a machine interior B side is sealed. The side lip 133 comes in close contact with, in a slidable manner, a dust cover 141 fixed to the outer periphery of the sleeve 144. Thereby, intrusion of muddy water and the like from a machine exterior A is prevented and, in turn, declines in sealability, which are caused by muddy water and the like biting into the main lip 132, are prevented.

SUMMARY OF THE INVENTION

Problem to be Solved by the Invention

However, the side lip 133 is formed from a rubber-like elastic material (a rubber material or a synthetic resin material having rubber-like elasticity) and, consequently, stress relaxation may occur as a result of deterioration over time, thus, interference with respect to the dust cover 141 declines, leading to decline in sealability with respect to muddy water and the like from the machine exterior A. Additionally, in cases where the dust cover 141 is incorporated offset to the machine interior B side from a normal position, an under portion 133b of the side lip 133 will be pressed against the dust cover 141. Consequently, a leading end portion 133a may more easily lift up and sealability with respect to muddy water and the like may decline. Additionally, in cases where the dust cover 141 is incorporated offset from a normal position toward the side opposite the machine interior B side, only the leading end portion 133a of the side lip 133 will be in contact with the dust cover 141. Consequently, contact area will be small and adherence will decline and, in this case, sealability with respect to muddy water and the like may also decline.

In light of the problems described above, a technical object of the present invention is to provide a sealing device for sealing a shaft periphery or the like prone to exposure to muddy water and the like, whereby stable sealability can be maintained over an extended period of time.

Means for Solving the Problem

The present invention utilizes the following means to effectively solve the technical problem described above.

Specifically, a sealing device according to the invention of the first aspect includes a metal ring, a main lip, an annular elastic body, a sliding ring, and biasing means. The metal ring is hermetically fixed to a housing. The main lip is bonded to the metal ring and is in close contact with, in a slidable manner, an outer periphery surface of a rotating body inserted through an inner circumference of the housing. The annular elastic body is bonded to the metal ring on an outer side of the main lip, and stretchable in an axial direction. The sliding ring is provided at an end portion of the annular elastic body on a side opposite the metal ring, and is in close contact with, in a slidable manner, a seal flange attached to an outer periphery of the rotating body. The biasing means is configured to elastically press the sliding ring against the seal flange.

According to the configuration described above, the sliding ring provided at the end portion of the annular elastic body is pressed by the biasing means so as to be in close contact with the seal flange in a slidable manner. As such, muddy water and the like from outside is sealed out, which leads to increased axial direction following property of the sliding ring to the seal flange. As a result, declines in the sealability of the main lip, caused by the muddy water and the like from outside biting into the main lip, can be effectively prevented.

A sealing device according to the second aspect of the present invention is the sealing device according to the first aspect of the present invention, wherein the sliding ring includes a seal surface in close contact with the seal flange at flat surfaces of the seal surface of sliding ring and the seal flange in a slidable manner.

According to the configuration described above, the sliding ring is in close contact with the seal flange at the flat surfaces of the seal surface of the sliding ring and the seal flange and, as a result, a wide seal surface is secured, which leads to increased sealability with respect to muddy water and the like.

A sealing device according to the third aspect of the present invention is the sealing device according to the first or second aspect of the present invention, wherein the annular elastic body is formed into a bellows shape.

According to the configuration described above, the annular elastic body is formed into the bellows shape and, as a result, the degree of freedom of stretching thereof increases, which leads to further increases in the axial direction following property of the sliding ring to the seal flange.

Effect of the Invention

According to the sealing device of the present invention, a configuration is given in which the sliding ring is made to be in close contact with the seal flange in a slidable manner by the biasing means. As a result, the intrusion of muddy water and the like from outside can be prevented and stable sealability can be maintained over an extended period of time.

DETAILED DESCRIPTION OF PREFERRED EMBODIMENTS

Figure 1:
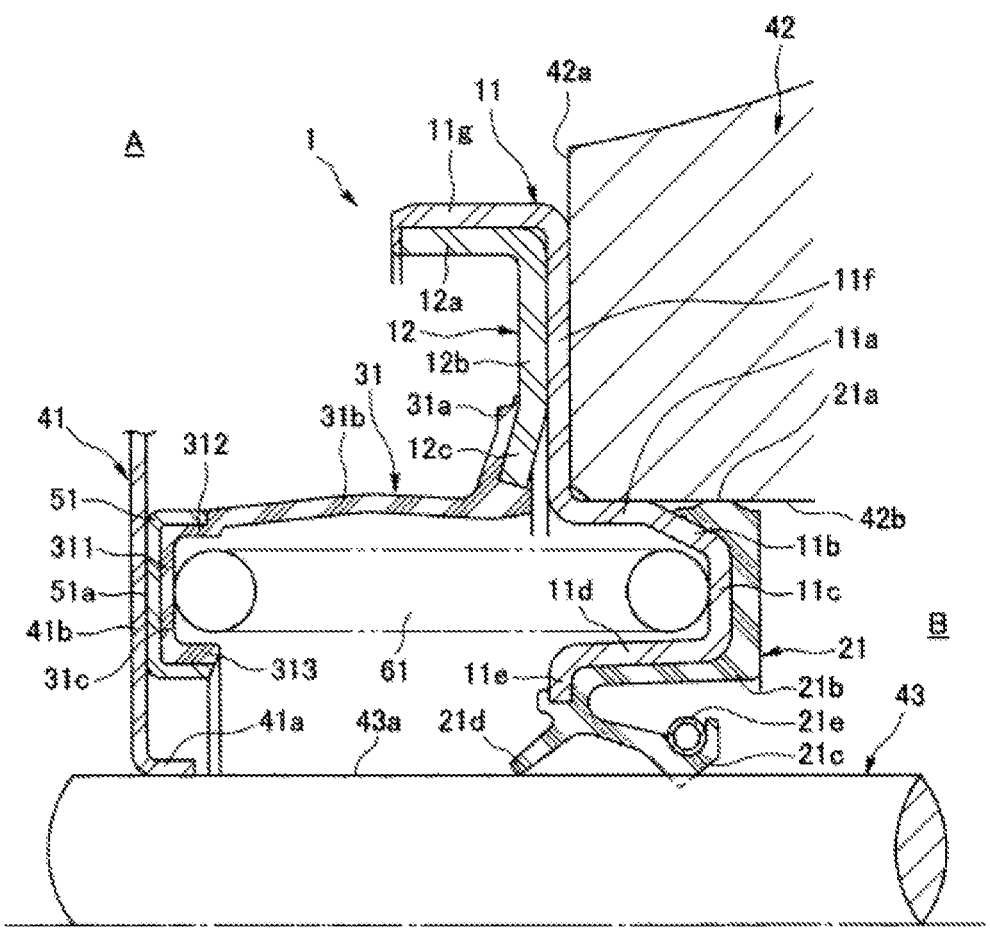
FIG. 1 is a half cross-sectional view illustrating a first embodiment of a sealing device according to the present invention, cut at a plane passing through a shaft center.

Hereinafter, a sealing device of the present invention will be described while referring to the drawings. Note that, in the following description and drawings, reference sign "A" is a side exposed to muddy water and the like, and is referred to as "machine exterior"; and reference sign "B" is a side where oil to be sealed is present, and is referred to as "machine interior".

FIG. 1 illustrates a first embodiment of a sealing device according to the present invention. A sealing device 1 is a device for being interposed between a housing 42 and a rotating shaft 43 inserted through an inner circumference of the housing 42. The sealing device 1 includes a first metal ring 11, a main body portion 21, a second metal ring 12, an annular elastic body 31, a sliding ring 51, and a biasing means 61. The first metal ring 11 is hermetically fixed to the housing 42. The main body portion 21 is formed from a rubber-like elastic material (a rubber material or a synthetic resin material having rubber-like elasticity) and bonded to the first metal ring 11 by vulcanization adhesion or the like. The second metal ring 12 is mated integrally with the first metal ring 11. The annular elastic body 31 is bonded to the second metal ring 12 by vulcanization adhesion or the like. The sliding ring 51 is disposed outward (in the machine exterior A side) of the main body portion 21 and adhered to an end portion of the annular elastic body 31 on a side opposite the second metal ring 12. The biasing means 61 is configured to elastically press the sliding ring 51 against a seal flange 41b of a dust cover 41 integrally mated with an outer periphery surface 43a of the rotating shaft 43. Note that the first metal ring 11 and the second metal ring 12 correspond to the metal ring recited in claim 1.

The first metal ring 11 is, for example, manufactured by punch press molding a metal plate and is formed from a press-fit cylindrical portion 11a, an outer periphery seal retaining portion 11b, a spring supporting portion 11c, an inner circumference cylindrical portion 11d, an inner diameter flange portion 11e, an outer diameter flange portion 11f, and an outer periphery cylindrical portion 11g. The press-fit cylindrical portion 11a is press-fitted to an inner circumferential surface 42b of the housing 42. The outer periphery seal retaining portion 11b extends so as to gradually decrease in diameter from an end portion of the press-fit cylindrical portion 11a on the machine interior B side toward the machine interior B side. The spring supporting portion 11c extends from an end portion of the outer periphery seal retaining portion 11b on the machine interior B side to an inner diameter side. The inner circumference cylindrical portion 11d is folded back and extends from an end portion of the spring supporting portion 11c on the inner diameter side toward a side opposite the machine interior B. The inner diameter flange portion 11e bends from an end portion of the inner circumference cylindrical portion 11d on a side opposite the machine interior B to the inner diameter side. The outer diameter flange portion 11f extends from an end portion of the press-fit cylindrical portion 11a on a side opposite the machine interior B to an outer diameter side. The outer periphery cylindrical portion 11g bends and extends from an end portion of the outer diameter flange portion 11f on the outer diameter side to a side opposite the housing 42.

The main body portion 21 includes an outer periphery seal portion 21a, a covering layer 21b, a main lip 21c, and a dust lip 21d. The outer periphery seal portion 21a is provided on the outer periphery of the outer periphery seal retaining portion 11b of the first metal ring 11 and is in close contact with the inner circumferential surface 42b of the housing 42 with a suitable compression margin. The covering layer 21b covers a surface of the spring supporting portion 11c on the machine interior B side, a surface of the inner circumference cylindrical portion 11d on the inner diameter side, and the inner diameter flange portion 11e. The main lip 21c extends from an inner diameter end portion of the covering layer 21b that covers the inner diameter flange portion 11e toward the machine interior B side and is in close contact with, in a slidable manner, the outer periphery surface 43a of the rotating shaft 43. The dust lip 21d extends from the inner diameter end portion of the covering layer 21b to a side opposite the main lip 21c and is in close contact with, in a slidable manner, the outer periphery surface 43a of the rotating shaft 43. A garter spring 21e for compensating the fastening force against the outer periphery surface 43a of the rotating shaft 43 is attached to the main lip 21c.

As with the first metal ring 11, the second metal ring 12 is, for example, manufactured by punch press molding a metal plate and is formed from an outer periphery cylindrical portion 12a, a flange portion 12b, and a tapered portion 12c. The outer periphery cylindrical portion 12a is press-fitted to an inner circumferential surface of the outer periphery cylindrical portion 11g of the first metal ring 11. The flange portion 12b extends from an end portion of the outer periphery cylindrical portion 12a on a housing 42 side to the inner diameter side and is in close contact with the outer diameter flange portion 11f of the first metal ring 11. The tapered portion 12c extends inclining from an inner diameter end portion of the flange portion 12b in a direction away from the outer diameter flange portion 11f of the first metal ring 11.

The annular elastic body 31 is formed from the rubber-like elastic material and includes an adhered portion 31a, a substantially cylindrical flexible portion 31b, and a spring receiving portion 31c. The adhered portion 31a is adhered to the tapered portion 12c of the second metal ring 12 by vulcanization adhesion or the like. The flexible portion 31b extends in substantially an axial direction from an end portion of the adhered portion 31a on an inner diameter side toward a side opposite the second metal ring 12, and is capable of elastic deformation in the axial direction. The spring receiving portion 31c is formed at an end portion of the flexible portion 31b. A cross-sectional shape of the spring receiving portion 31c cut at a plane passing through a shaft center of the rotating shaft 43 is substantially a C shape. That is, the spring receiving portion 31c includes a diameter direction portion 311 and axial direction portions 312 and 313 on both the inner and outer periphery sides of the diameter direction portion 311, and the axial direction portion 312 on the outer periphery side is continuous with the flexible portion 31b.

The sliding ring 51 is integrally bonded to the spring receiving portion 31c of the annular elastic body 31 by adhesion or the like. A cross-sectional shape of the sliding ring 51 cut at a plane passing through the shaft center is substantially a C shape that corresponds to the spring receiving portion 31c, and the sliding ring 51 is formed from polytetrafluoroethylene (PTFE) that has a low coefficient of friction and excellent heat resistance. This sliding ring 51 includes a seal surface 51a in close contact with, in a slidable manner, the dust cover 41 at flat surfaces of the sliding ring 51 and the dust cover 41 orthogonal to the shaft center of the rotating shaft 43.

The dust cover 41 is formed from a metal and an inner diameter portion 41a thereof is mated integrally with the outer periphery surface 43a of the rotating shaft 43. Additionally, the dust cover 41 includes a seal flange 41b in close contact with the seal surface 51a of the sliding ring 51 at the flat surfaces of the seal surface 51a of the dust cover 41 and the seal surface 51a of the sliding ring 51, and the seal flange 41b develops as a flat surface orthogonal to the shaft center of the rotating shaft 43. As such, the dust cover 41 rotates integrally with the rotating shaft 43.

The biasing means 61 is formed from one compression coil spring disposed concentrically with the first metal ring 11, in a state compressed in the axial direction, between the spring supporting portion 11c of the first metal ring 11 and the spring receiving portion 31c of the annular elastic body 31. The biasing means 61 elastically biases the sliding ring 51, via the spring receiving portion 31c of the annular elastic body 31, in the axial direction, and causes the seal surface 51a of the sliding ring 51 to be in close contact with the seal flange 41b of the dust cover 41 with suitable surface pressure.

In the sealing device 1 of the present invention configured as described above, the outer periphery seal portion 21a of the main body portion 21 prevents oil that exists in the machine interior B from leaking to the machine exterior A from between the housing 42 and the first metal ring 11. Additionally, the main lip 21c of the main body portion 21 prevents oil that exists in the machine interior B from leaking outward through the shaft periphery by being in close contact with, in a slidable manner, the outer periphery surface 43a of the rotating shaft 43.

Meanwhile, the sliding ring 51 integrally bonded to the spring receiving portion 31c at the leading end of the annular elastic body 31 prevents the intrusion of muddy water and the like from the machine exterior A by the seal surface 51a being in close contact with, in a slidable manner, the seal flange 41b of the dust cover 41. Moreover, the sliding ring 51 is in close contact with the seal flange 41b of the dust cover 41 at the flat surfaces of the sliding ring 51 and the seal flange 41b. Therefore, diameter directional width of the seal surface 51a is wide and, as such, excellent sealability is secured. Furthermore, the sliding ring 51 is formed from PTFE having a low coefficient of friction and, therefore, sliding torque and sliding load are kept low, in spite of the wide sliding area.

Additionally, the sliding ring 51 is attached to the spring receiving portion 31c at the leading end of the annular elastic body 31 that is stretchable in the axial direction, and is elastically biased in the axial direction by the biasing means 61 formed from the compression coil spring. Therefore, axial direction following property of the sliding ring 51 with respect to axial direction displacement of the dust cover 41 can be improved. As such, for example, in cases where the dust cover 41 is incorporated at a position where the rotating shaft 43 is slightly offset to the machine interior B side from the normal position, and also in cases where incorporated at a position offset to a side opposite the machine interior B side, the seal surface 51a follows to the seal flange 41b, thus maintaining an excellent state of close contact and preventing the intrusion of muddy water and the like from the machine exterior A. As a result, declines in the sealability caused by muddy water and the like biting into the main lip 21c can be effectively prevented.

Figure 2:
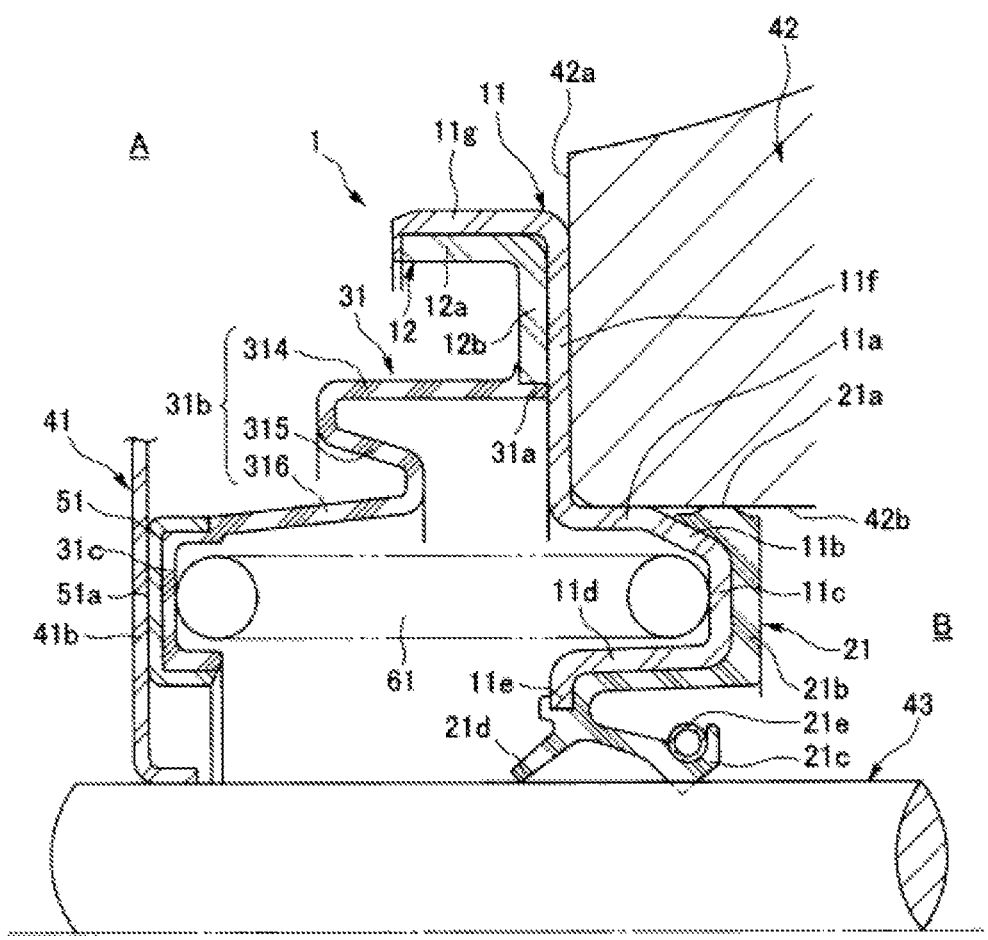
FIG. 2 is a half cross-sectional view illustrating a second embodiment of a sealing device according to the present invention, cut at a plane passing through a shaft center.
Figure 3:
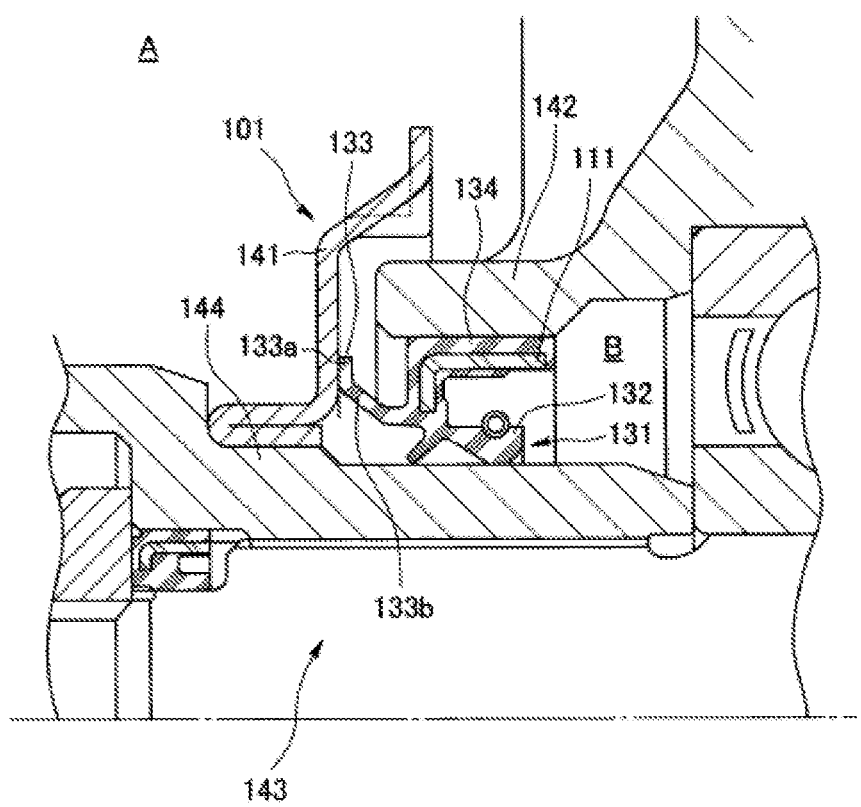
FIG. 3 is a half cross-sectional view illustrating an example of a sealing device according to conventional technology, cut at a plane passing through a shaft center.

FIG. 2 illustrates a second embodiment of a sealing device according to the present invention. The sealing device 1 of the second embodiment fundamentally has the same configuration as the first embodiment described above, with the exception that the flexible portion 31b of the annular elastic body 31 is formed into a bellows shape.

Specifically, the flexible portion 31b of the annular elastic body 31 includes a large diameter cylindrical portion 314 disposed near the adhered portion 31a adhered to the second metal ring 12, a middle portion 315, and a small diameter cylindrical portion 316. The middle portion 315 extends so as to be folded back from an end portion of the large diameter cylindrical portion 314 on a side opposite the adhered portion 31a toward the inner diameter side and also toward the outer diameter flange portion 11f side of the first metal ring 11. The small diameter cylindrical portion 316 extends in the axial direction so as to be folded back from the middle portion 315 toward the inner diameter side and also toward a side opposite the outer diameter flange portion 11f and is continuous with the spring receiving portion 31c. That is, a cross-sectional shape of the flexible portion 31b of the annular elastic body 31 cut at a plane passing through the shaft center is substantially an S-shaped meandering shape.

Note that the second metal ring 12 includes the outer periphery cylindrical portion 12a and the flange portion 12b. The outer periphery cylindrical portion 12a is press-fitted against the inner circumferential surface of the outer periphery cylindrical portion 11g of the first metal ring 11. The flange portion 12b extends from the end portion of the outer periphery cylindrical portion 12a near the housing 42 to the inner diameter side and is in close contact with the outer diameter flange portion 11f of the first metal ring 11. That is, a cross-sectional shape of the second metal ring 12 cut at a plane passing through the shaft center is substantially an L shape, and the adhered portion 31a of the annular elastic body 31 is adhered to the inner diameter end portion of the flange portion 12b of the second metal ring 12.

That is, according to the second embodiment, the flexible portion 31b of the annular elastic body 31 is formed into a bellows shape and, therefore, the degree of freedom of elastic deformation in the axial direction increases. Accordingly, axial direction following property of the sliding ring 51 with respect to axial direction incorporation errors and axial direction displacement of the dust cover 41 can be further improved, and an excellent state of close contact between the seal surface 51a and the seal flange 41b can be maintained.

Note that various modifications can be made to the sealing device in detail described above without departing from the scope of the invention. Specifically, in the embodiments illustrated in the drawings, the biasing means 61 is configured by one compression coil spring, but a configuration is possible in which, for example, a plurality of compression coil springs are arranged at a predetermined interval in the circumferential direction.

What is claimed is:

1. A sealing device for sealing a machine interior from a machine exterior, comprising:
    a first metal ring hermetically fixed to a housing;
    a second metal ring directly mated to the first metal ring;
    a main lip bonded to the first metal ring and in close contact with, in a slidable manner, an outer peripheral surface of a rotating shaft inserted through an inner circumference of the housing, the main lip being located proximate the machine interior;
    an annular elastic body bonded to the second metal ring on an outer side of the main lip, the annular elastic body extending axially away from the second metal ring and the main lip and being stretchable in an axial direction, and including a portion that extends radially inwardly toward the rotating shaft and is configured for receipt of a biasing means; and
    a sliding ring provided at an end portion of the annular elastic body on a side opposite the second metal ring away from the machine interior and proximate the machine exterior, and in close contact with, in a slidable manner, a seal flange that is fixed directly to the outer peripheral surface of the rotating shaft,
    wherein the sliding ring is C-shaped in cross-section and configured for receipt of the portion of the annular elastic body that extends radially inwardly therein, and
    wherein the biasing means is configured to elastically press the sliding ring against the seal flange.

2. The sealing device according to claim 1, wherein:
    the sliding ring includes a seal surface in close contact with the seal flange at flat surfaces of the seal surface of the sliding ring and the seal flange in a slidable manner.

3. The sealing device according to claim 1, wherein:
    the annular elastic body is formed into a bellows shape.

4. The sealing device according to claim 2, wherein:
    the annular elastic body is formed into a bellows shape.

* * * * *